(12) United States Patent
Sixtoes

(10) Patent No.: US 12,281,732 B2
(45) Date of Patent: Apr. 22, 2025

(54) SWIVEL JOINT DEVICE

(71) Applicant: Todd Sixtoes, Sioux Falls, SD (US)

(72) Inventor: Todd Sixtoes, Sioux Falls, SD (US)

( * ) Notice: Subject to any disclaimer, the term of this patent is extended or adjusted under 35 U.S.C. 154(b) by 211 days.

(21) Appl. No.: 17/895,641

(22) Filed: Aug. 25, 2022

(65) Prior Publication Data

US 2024/0068609 A1 Feb. 29, 2024

(51) Int. Cl.
*F16L 27/08* (2006.01)
*A47L 9/24* (2006.01)

(52) U.S. Cl.
CPC ........... *F16L 27/0804* (2013.01); *A47L 9/242* (2013.01)

(58) Field of Classification Search
CPC .............. F16L 27/0828; F16L 27/0824; F16L 27/0804; F16L 33/30; A47L 9/242
USPC ......................................... 285/903, 278, 280
See application file for complete search history.

(56) References Cited

U.S. PATENT DOCUMENTS

| | | | | |
|---|---|---|---|---|
| 3,017,654 A * | 1/1962 | Allenby | ............... | F16L 27/0812 285/280 |
| 3,167,330 A * | 1/1965 | Draudt | ..................... | F16L 33/24 285/903 |
| 3,591,889 A * | 7/1971 | Wisher | ................ | A47L 11/4094 15/322 |
| 4,839,063 A * | 6/1989 | Brooks | ................. | E04H 4/1681 210/780 |
| 5,165,734 A * | 11/1992 | Smith | ................. | F16L 27/0828 285/276 |
| 6,508,492 B2 * | 1/2003 | Nixon | ................. | F16L 27/0812 285/280 |
| 7,249,996 B1 | 7/2007 | Volyar | | |
| 7,543,607 B2 * | 6/2009 | Henkin | ................. | E04H 4/1654 138/119 |
| 8,348,726 B2 * | 1/2013 | Brunner | ................. | B24B 55/10 451/354 |
| 8,882,158 B2 * | 11/2014 | Gov | ........................ | F16L 23/02 285/368 |
| 10,544,812 B2 | 1/2020 | Ghirardi | | |
| 11,060,643 B2 * | 7/2021 | Wermann | ............ | F16L 27/0828 |
| 2002/0043803 A1 * | 4/2002 | Kietzmann | ......... | F16L 27/0824 285/276 |
| 2019/0145554 A1 | 5/2019 | Kuo | | |

FOREIGN PATENT DOCUMENTS

| | | |
|---|---|---|
| CN | 210034678 | 5/2019 |
| KR | 006055185 | 5/2006 |
| KR | 623939 | 9/2006 |
| KR | 1331060 | 11/2013 |
| KR | 2016134300 | 11/2016 |

* cited by examiner

*Primary Examiner* — David Bochna

(57) ABSTRACT

A swivel joint device for limiting kinking of a vacuum hose includes a first connector and a second connector, which attach to respective ends of a first section and a second section of a vacuum hose, respectively. The second connector is complementary to the first connector and thus is selectively engageable to the first connector. The second connector and the first connector join the second section and the first section of the vacuum hose. At least one of the second connector and the first connector comprises a bearing so that the second section and the first section of the vacuum hose are rotatable relative to each other. The second connector and the first connector thus limit kinking of the vacuum hose.

10 Claims, 5 Drawing Sheets

SWIVEL JOINT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to swivel joints and more particularly pertains to a new swivel joint for limiting kinking of a vacuum hose. The present invention discloses a swivel joint, multiples of which are used to join sections of a vacuum hose so that it is substantially resistant to kinking.

(2) Description of Related Art Including Information Disclosed Under 37 CFR 1.97 and 1.98

The prior art relates to swivel joints. Korean Patents numbered KR2006055185 and KR623939 disclose swivel joints, which are attachable to air hoses and threadedly attachable to air tools. The swivel joints allow the air tools to rotate relative to the air hoses. These patents do not anticipate the use of one or more swivel joints positioned in a vacuum hose to prevent kinking of the vacuum hose. Related prior art comprises swivel connections for connecting water hoses to shower heads, spigots, and the like. The prior art does not teach the used of multiple swivel joints in a vacuum hose, and in particular a vacuum hoses between a vacuum and a dust generating device, wherein the swivel joints limit or prevent kinking of the vacuum hose.

BRIEF SUMMARY OF THE INVENTION

An embodiment of the disclosure meets the needs presented above by generally comprising a first connector and a second connector, which are configured for attachment to respective ends of a first section and a second section of a vacuum hose, respectively. The second connector is complementary to the first connector and thus is selectively engageable to the first connector. The second connector and the first connector are configured to join the second section and the first section of the vacuum hose. At least one of the second connector and the first connector comprises a bearing so that the second section and the first section of the vacuum hose are rotatable relative to each other. The second connector and the first connector thus are configured to limit kinking of the vacuum hose.

Another embodiment of the invention comprises a non-kinking vacuum hose assembly, which includes a vacuum hose and a plurality of swivel joint devices, as described above. The vacuum hose comprises a plurality of sections. Each second connector is engaged to a respective first connector so that the sections of the plurality of sections of the vacuum hose are joined. With at least one of the second connector and the first connector of each swivel joint device comprising a bearing, the sections of the vacuum hose are rotatable relative to each other and kinking of the vacuum hose is limited.

Yet another embodiment of the invention comprises a non-kinking vacuum hose system, which comprises the non-kinking vacuum hose assembly described above, a vacuum, and a dust generating device. The vacuum hose of non-kinking vacuum hose assembly is attached to and extends between the vacuum and the dust generating device and thus is configured to collect dust that is generated by the dust generating device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
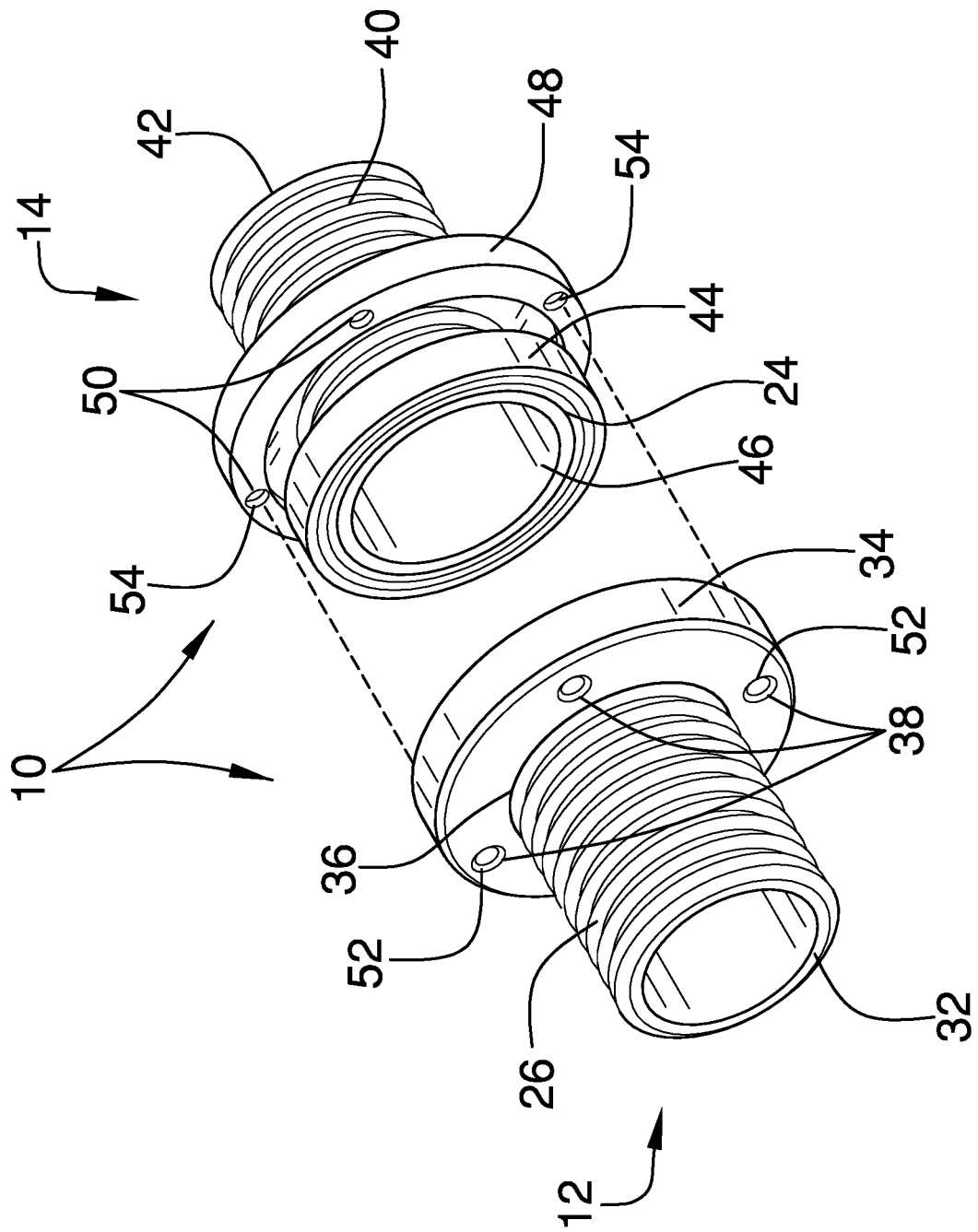
FIG. 1 is an exploded view of a swivel joint device according to an embodiment of the disclosure.
Figure 2:
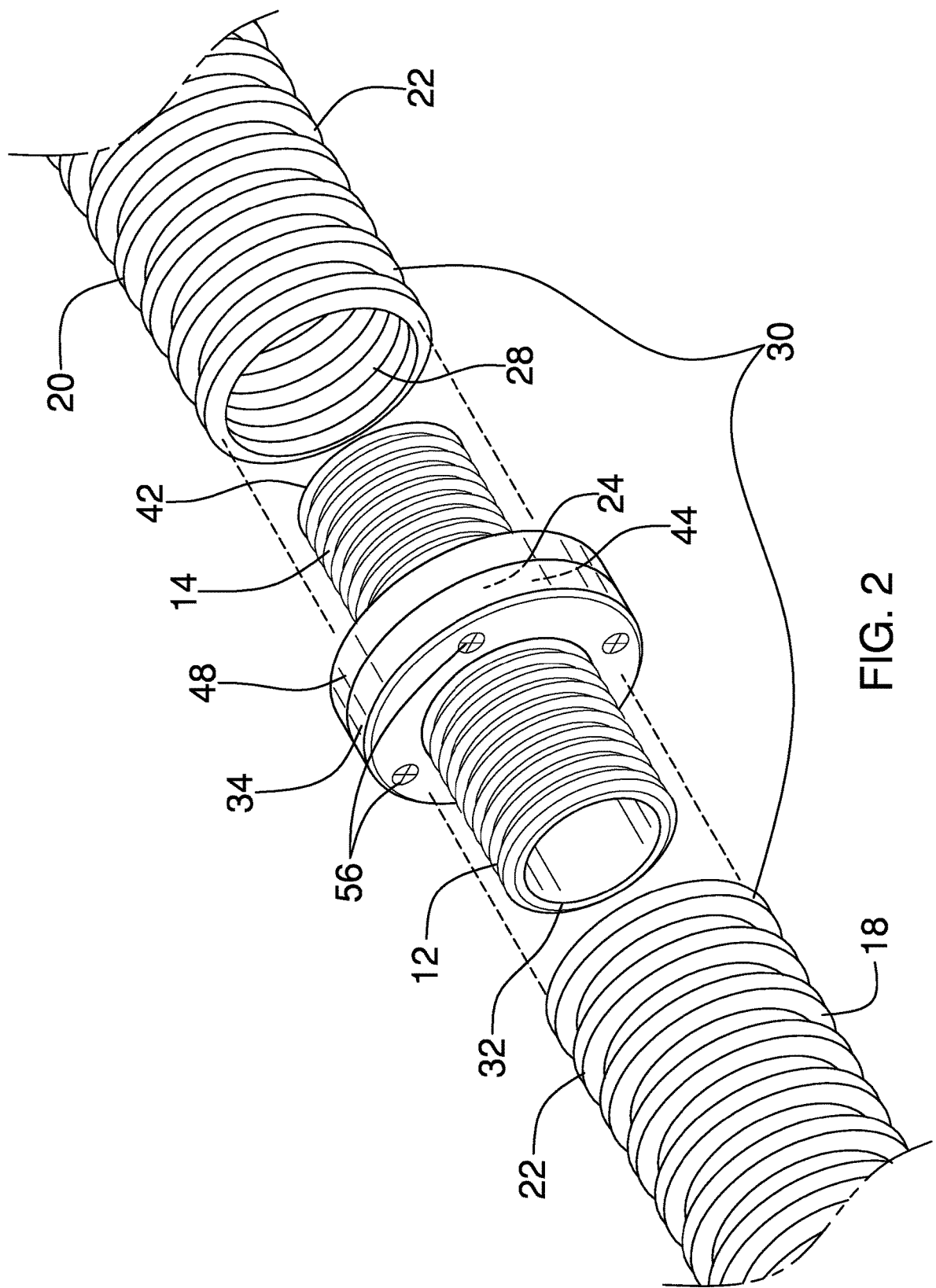
FIG. 2 is an in-use view of an embodiment of the disclosure.
Figure 3:
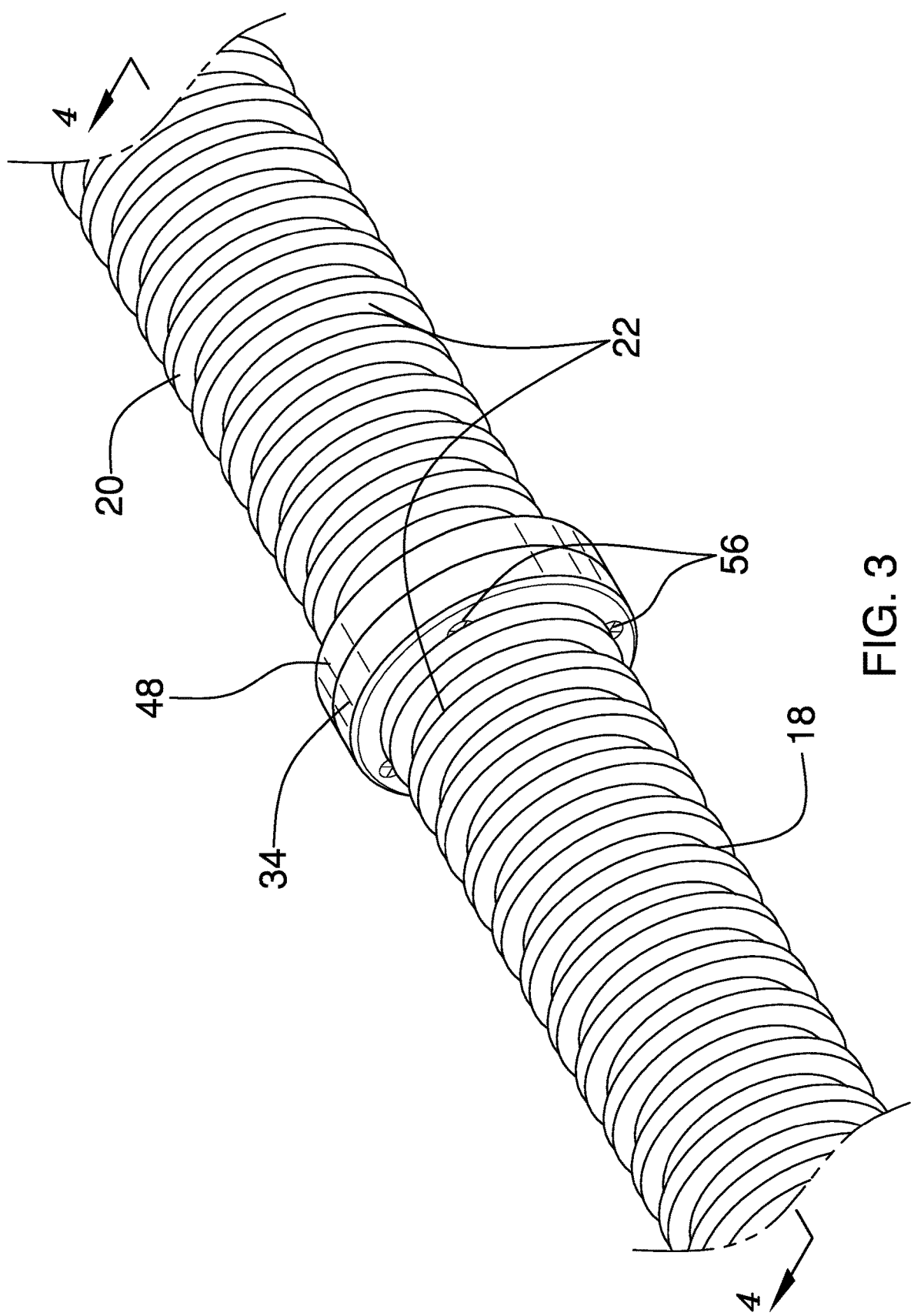
FIG. 3 is an in-use view of an embodiment of the disclosure.
Figure 4:
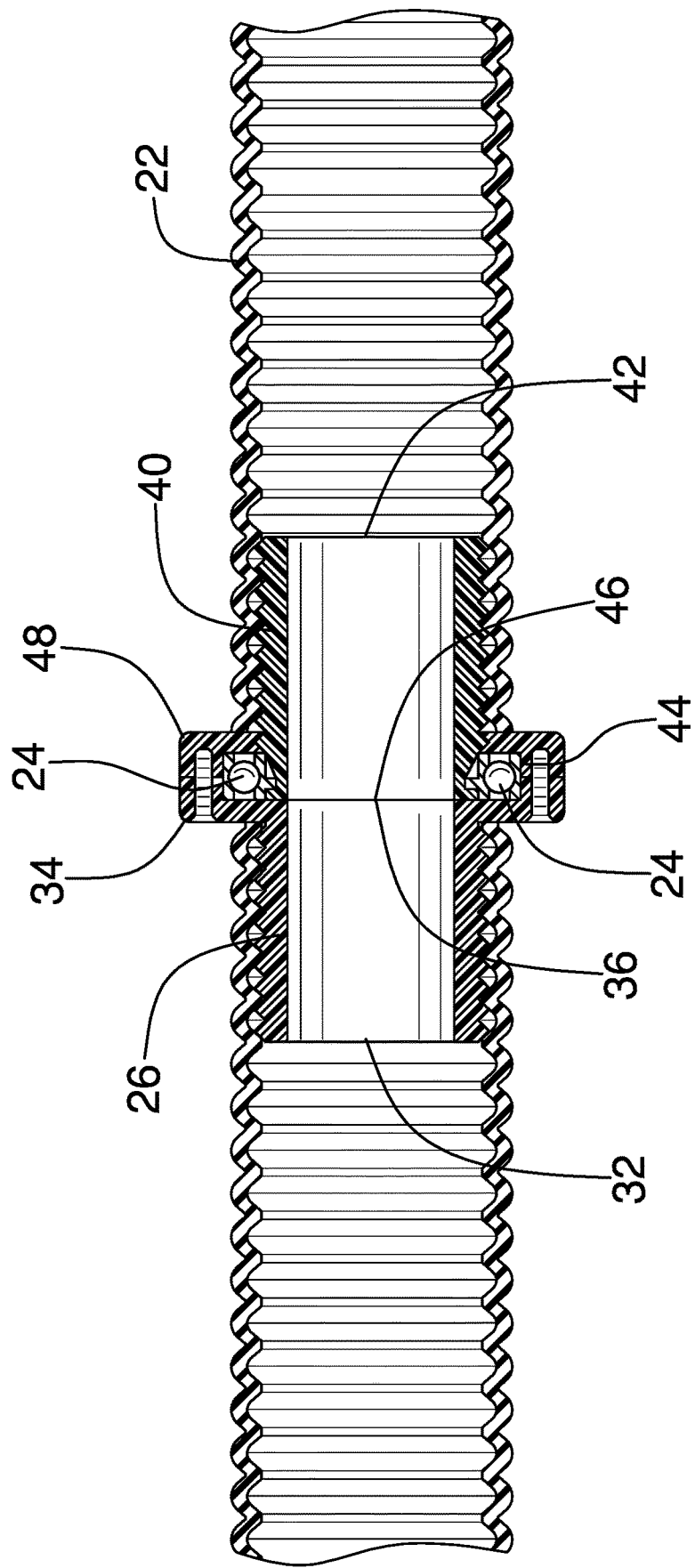
FIG. 4 is a cross-sectional view of an embodiment of the disclosure.
Figure 5:
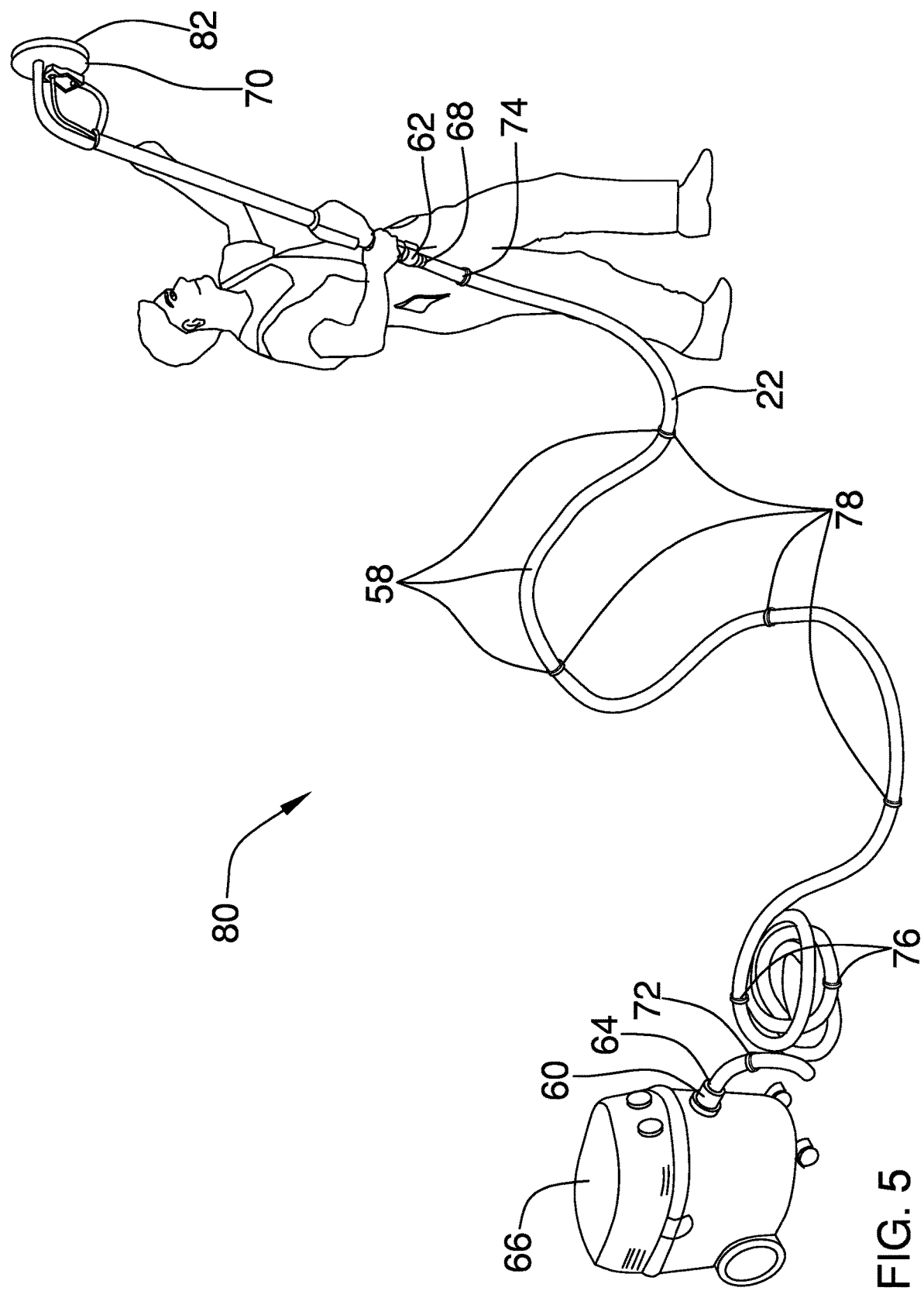
FIG. 5 is an in-use view of an embodiment of the disclosure.

With reference now to the drawings, and in particular to FIGS. 1 through 5 thereof, a new swivel joint embodying the principles and concepts of an embodiment of the disclosure and generally designated by the reference numeral 10 will be described.

As best illustrated in FIGS. 1 through 5, the swivel joint device 10 generally comprises a first connector 12 and a second connector 14, which are configured to attach to respective ends 16 of a first section 18 and a second section 20 of a vacuum hose 22, respectively. The second connector 14 is complementary to the first connector 12 and thus is selectively engageable to the first connector 12. The second connector 14 and the first connector 12 are configured to join the second section 20 and the first section 18 of the vacuum hose 22. At least one of the second connector 14 and the first connector 12 comprises a bearing 24 so that the second section 20 and the first section 18 of the vacuum hose 22 are rotatable relative to each other. The second connector 14 and the first connector 12 thus are configured to limit kinking of the vacuum hose 22.

The first connector 12 comprises a first pipe 26, which is externally threaded and circumferentially complementary to an inner circumference 28 of a respective section 30 of the vacuum hose 22. The first pipe 26 is selectively threadedly insertable, by a first endpoint 32, into the respective section 30 of the vacuum hose 22 to attach the first connector 12 to the respective section 30 of the vacuum hose 22. An outer flange 34 is fixedly attached to a second endpoint 36 of the first pipe 26. A first fastener 38 is attached to the outer flange 34.

The second connector 14 comprises a second pipe 40, which is externally threaded and circumferentially complementary to the inner circumference 28 of a respective section 30 of the vacuum hose 22. The second pipe 40 is selectively threadedly insertable, by a first end 42, into the respective section 30 of the vacuum hose 22 to attach the second connector 14 to the respective section 30 of the vacuum hose 22. An inner flange 44 is positioned around the second pipe 40 proximate to a second end 46 of the second pipe 40. The inner flange 44 is circumferentially complementary to the outer flange 34 and thus is selectively insertable into the outer flange 34. The bearing 24 is attached to the inner flange 44 so that the bearing 24 is positioned between and the inner flange 44 and the second pipe 40. A ring 48 is selectively positionable around the second pipe 40 so that the ring 48 abuts the outer flange 34. A second fastener 50, which is attached to the ring 48, is complementary to the first fastener 38 and thus is positioned to selectively engage the first fastener 38 to attach the second connector 14 to the first connector 12 and thereby joining the respective sections 30.

By using a first connector 12 and a second connector 14 having a first pipe 26 and a second pipe 40 that are circumferentially complementary to sections 30 of vacuum hoses 22 having different inner circumferences 28, it is possible to join vacuum hoses 22 of different sizes.

The first fastener 38 and the second fastener 50 may comprise a plurality of first holes 52 and a plurality of second holes 54, respectively, with the first holes 52 and the second holes 54 being internally threaded. The ring 48 is configured to be rotated relative to the outer flange 34 to align each second hole 54 with a respective first hole 52. Each screw 56 of a plurality of screws 56 is selectively threadedly insertable into a respective first hole 52 and an aligned second hole 54 to attach the outer flange 34 to the ring 48. The present invention anticipates the first fastener 38 and the second fastener 50 comprising other fastening means, such as, but not limited to, welds, glues, quick connects, and the like.

The present invention anticipates a non-kinking vacuum hose assembly 58, which comprises a vacuum hose 22 and a plurality of swivel joint devices 10, as described above. The vacuum hose 22 comprises a plurality of sections 30. Each second connector 14 is engaged to a respective first connector 12 so that the sections 30 of the plurality of sections 30 of the vacuum hose 22 are joined. With at least one of the second connector 14 and the first connector 12 of each swivel joint device 10 comprising a bearing 24, the sections 30 of the vacuum hose 22 are rotatable relative to each other and kinking of the vacuum hose 22 is limited.

The non-kinking vacuum hose assembly 58 also may include a first coupler 60 and a second coupler 62. The first coupler 60 is attached to a first terminus 64 of the vacuum hose 22 and is configured for attachment to a vacuum 66. The second coupler 62 is attached to a second terminus 68 of the vacuum hose 22 and is configured for attachment to a dust generating device 70.

The plurality of swivel joint devices 10 comprises a first joint device 72 and a second joint device 74, which are positioned proximate to the first coupler 60 and proximate to the second coupler 62, respectively. The plurality of swivel joint devices 10 also comprises a plurality of first medial joint devices 76 and a plurality of second medial joint devices 78. The first medial joint devices 76 extend from the first joint device 72 and are positioned at intervals of from 1.25 to 2.15 m. The second medial joint devices 78 extend between the second joint device 74 and the plurality of first medial joint devices 76 at intervals of 0.60 to 1.25 m.

In a specific configuration, the first joint device 72 is positioned approximately 0.20 m from the first coupler 60 and the second joint device 74 is positioned approximately 0.20 m from the second coupler 62, which facilitates attachment and detachment of the first coupler 60 and the second coupler 62 to and from a vacuum 66 and a dust generating device 70. The plurality of first medial joint devices 76 is positioned 1.50 to 1.85 m from the first joint device 72 and comprises two or three first medial joint devices 76, which are separated by 1.50 to 1.85 m. The plurality of second medial joint devices 78 is approximately 0.91 m from the plurality of first medial joint devices 76 and comprises four second medial joint devices 78, which are separated by approximately 0.91 m. The vacuum hose 22 thus measures between approximately 7.95 m to approximately 10.50 m.

The present invention also anticipates a non-kinking vacuum hose system 80, which comprises a vacuum 66 and a dust generating device 70, in addition to a non-kinking vacuum hose assembly 58, as described above. The vacuum hose 22 of the non-kinking vacuum hose assembly 58 is attached to and extends 16 between the vacuum 66 and the dust generating device 70 and thus is configured to collect dust that is generated by the dust generating device 70. The dust generating device 70 may comprise a sander 82, such as might be used in drywall finishing, floor refinishing, woodworking, and the like.

As will be appreciated, significant experimentation was required to obtain an optimal configuration for a vacuum hose 22 measuring between approximately 7.95 m to approximately 10.50 m for use between the sander 82 and the vacuum 66. It is anticipated that other configurations comprising various numbers of swivel joint devices and sections 30 of vacuum hose 22, with sections 30 of various lengths, will be found optimal for other types of vacuums 66 and dust generating devices 70 and for use in rooms of various sizes.

In use, a vacuum hose 22 comprising a plurality of sections 30, which are connected by the swivel joint devices 10, is attached to a vacuum 66 and a sander 82. A user then can use the sander 82 to finish drywall, with the dust that is generated being suctioned through the vacuum hose 22 by the vacuum 66, which traps the dust. Tension in the vacuum hose 22 causes the sections 30 to twist freely, as needed, to prevent the vacuum hose 22 from kinking. This is important as the vacuum 66 and the sander 82 are relatively heavy and bulky, rendering unwinding of the vacuum hose 22 difficult and unwieldy without installation of the swivel joint devices 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction shown and operation described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swivel joint device comprising:
   a first connector configured for attachment to a respective end of a first section of a vacuum hose;
   a second connector configured for attachment to a respective end of a second section of the vacuum hose, the second connector being complementary to the first connector, such that the second connector is selectively engageable to the first connector, wherein the second connector and the first connector are configured for joining the second section and the first section of the vacuum hose;
   at least one of the second connector and the first connector comprising a bearing, such that the second section and the first section of the vacuum hose are rotatable relative to each other, wherein the second connector and the first connector are configured for limiting kinking of the vacuum hose;
   wherein the first connector comprises:
     a first pipe, the first pipe being externally threaded and circumferentially complementary to an inner circumference of a respective section of the vacuum hose, such that the first pipe is selectively threadedly insertable by a first endpoint into the respective section of the vacuum hose for attaching the first connector to the respective section of the vacuum hose,
     an outer flange fixedly attached to a second endpoint of the first pipe wherein said first pipe is inhibited from rotating relative to said outer flange, and
     a first fastener attached to the outer flange;
   wherein the second connector comprises:
     a second pipe, the second pipe being externally threaded and circumferentially complementary to an inner circumference of a respective section of the vacuum hose, such that the second pipe is selectively threadedly insertable by a first end into the respective section of the vacuum hose for attaching the second connector to the respective section of the vacuum hose,
     an inner flange positioned around the second pipe proximate to a second end of the second pipe, the inner flange being circumferentially complementary to the outer flange, such that the inner flange is selectively insertable into the outer flange,
     the bearing being attached to the inner flange, such that the bearing is positioned between and the inner flange and the second pipe,
     a ring selectively positionable around the second pipe, such that the ring abuts the outer flange, and
     a second fastener attached to the ring, the second fastener being alignable with the first fastener, such that the second fastener and first fastener are positioned for being mutually engaged fixing a position of the first fastener and the second fastener relative to each other;
   the first fastener comprising a plurality of first holes, the first holes being internally threaded;
   the second fastener comprising a plurality of second holes, the second holes being internally threaded, wherein the ring is configured for rotating relative to the outer flange, such that each second hole is aligned with a respective first hole; and
   a plurality of screws, each screw being selectively threadedly insertable into a respective first hole and an aligned second hole for attaching the outer flange to the ring.

2. A non-kinking vacuum hose assembly comprising:
   a vacuum hose comprising a plurality of sections;
   a plurality of swivel joint devices, each swivel joint device comprising:
     a first connector selectively attachable to a respective end of a respective section of a vacuum hose,
     a second connector selectively attachable to a respective end of a respective section of the vacuum hose, the second connector being complementary to the first connector, the second connector being engaged to the first connector, such that the respective sections of the vacuum hose are joined, and
     at least one of the second connector and the first connector comprising a bearing, such that the respective sections of the vacuum hose are rotatable relative to each other and kinking of the vacuum hose is limited;
   wherein the plurality of swivel joint devices joins the plurality of sections to define the vacuum hose;
   wherein the first connector comprises:
     a first pipe, the first pipe being externally threaded and circumferentially complementary to an inner circumference of a respective section of the vacuum hose, such that the first pipe is selectively threadedly insertable by a first endpoint into the respective section of the vacuum hose for attaching the first connector to the respective section of the vacuum hose,
     an outer flange fixedly attached to a second endpoint of the first pipe wherein said first pipe is inhibited from rotating relative to said outer flange, and
     a first fastener attached to the outer flange;
   wherein the second connector comprises:
     a second pipe, the second pipe being externally threaded and circumferentially complementary to an inner circumference of a respective section of the vacuum hose, such that the second pipe is selectively threadedly insertable by a first end into the respective section of the vacuum hose for attaching the second connector to the respective section of the vacuum hose, an inner flange positioned around the second pipe proximate to a second end of the second pipe, the inner flange being circumferentially complementary to the outer flange, such that the inner flange is selectively insertable into the outer flange, the bearing being attached to the inner flange, such that the bearing is positioned between and the inner flange and the second pipe, a ring selectively positionable around the second pipe, such that the ring abuts the outer flange, and a second fastener attached to the ring, the second fastener being alignable with the first fastener, such that the second fastener and first fastener are positioned for being mutually engaged fixing a position of the first fastener and the second fastener relative to each other;

the first fastener comprising a plurality of first holes, the first holes being internally threaded;

the second fastener comprising a plurality of second holes, the second holes being internally threaded, wherein the ring is configured for rotating relative to the outer flange, such that each second hole is aligned with a respective first hole; and a plurality of screws, each screw being selectively threadedly insertable into a respective first hole and an aligned second hole for attaching the outer flange to the ring.

3. The non-kinking vacuum hose assembly of claim 2, further including:

a first coupler attached to a first terminus of the vacuum hose and being configured for attachment to a vacuum; and a second coupler attached to a second terminus of the vacuum hose and being configured for attachment to a dust generating device.

4. The non-kinking vacuum hose assembly of claim 3, wherein the plurality of swivel joint devices comprises:

a first joint device positioned proximate to the first coupler;

a second joint device positioned proximate to the second coupler;

a plurality of first medial joint devices, the first medial joint devices extending from the first joint device and being positioned at intervals of 1.25 to 2.15 m; and a plurality of second medial joint devices, the second medial joint devices extending between the second joint device and the plurality of first medial joint devices at intervals of 0.60 to 1.25 m.

5. The non-kinking vacuum hose assembly of claim 4, wherein:

the first joint device is positioned approximately 0.20 m from the first coupler;

the second joint device is positioned approximately 0.20 m from the second coupler;

the plurality of first medial joint devices is positioned 1.50 to 1.85 m from the first joint device;

the plurality of first medial joint devices comprises two or three first medial joint devices separated by 1.50 to 1.85 m;

the plurality of second medial joint devices is approximately 0.91 m from the plurality of first medial joint devices; and the plurality of second medial joint devices comprising four second medial joint devices separated by approximately 0.91 m, such that the vacuum hose measures between approximately 7.95 m to 10.50 m.

6. A non-kinking vacuum hose system comprising:
a vacuum;
a dust generating device;
a vacuum hose attached to and extending between the vacuum and the dust generating device, the vacuum hose comprising a plurality of sections;
a plurality of swivel joint devices, each swivel joint device comprising:
  a first connector attached to a respective end of a respective section of a vacuum hose,
  a second connector attached to a respective end of a respective section of the vacuum hose, the second connector being engaged to the first connector, such that the respective sections of the vacuum hose are joined, and
  at least one of the second connector and the first connector comprising a bearing, such that the respective sections of the vacuum hose are rotatable relative to each other and kinking of the vacuum hose is limited;
wherein the vacuum is configured for collecting dust generated by the dust generating device;
wherein the first connector comprises:
  a first pipe, the first pipe being externally threaded and circumferentially complementary to an inner circumference of a respective section of the vacuum hose, such that the first pipe is selectively threadedly insertable by a first endpoint into the respective section of the vacuum hose for attaching the first connector to the respective section of the vacuum hose,
  an outer flange fixedly attached to a second endpoint of the first pipe wherein said first pipe is inhibited from rotating relative to said outer flange, and
  a first fastener attached to the outer flange;
wherein the second connector comprises:
  a second pipe, the second pipe being externally threaded and circumferentially complementary to an inner circumference of a respective section of the vacuum hose, such that the second pipe is selectively threadedly insertable by a first end into the respective section of the vacuum hose for attaching the second connector to the respective section of the vacuum hose,
  an inner flange positioned around the second pipe proximate to a second end of the second pipe, the inner flange being circumferentially complementary to the outer flange, such that the inner flange is selectively insertable into the outer flange,
  the bearing being attached to the inner flange, such that the bearing is positioned between and the inner flange and the second pipe,
  a ring selectively positionable around the second pipe, such that the ring abuts the outer flange, and
  a second fastener attached to the ring, the second fastener being alignable with the first fastener, such that the second fastener and first fastener are positioned for being mutually engaged fixing a position of the first fastener and the second fastener relative to each other;
the first fastener comprising a plurality of first holes, the first holes being internally threaded;

the second fastener comprising a plurality of second holes, the second holes being internally threaded, wherein the ring is configured for rotating relative to the outer flange, such that each second hole is aligned with a respective first hole; and a plurality of screws, each screw being selectively threadedly insertable into a respective first hole and an aligned second hole for attaching the outer flange to the ring.

7. The non-kinking vacuum hose system of claim 6, wherein the dust generating device comprises a sander.

8. The non-kinking vacuum hose system of claim 6, further including:

a first coupler attached to a first terminus of the vacuum hose and being attached to the vacuum; and a second coupler attached to a second terminus of the vacuum hose and being attached to the dust generating device.

9. The non-kinking vacuum hose system of claim 8, wherein the plurality of swivel joint devices comprises:

a first joint device positioned proximate to the first coupler;

a second joint device positioned proximate to the second coupler;

a plurality of first medial joint devices, the first medial joint devices extending from the first joint device and being positioned at intervals of 1.25 to 2.15 m; and a plurality of second medial joint devices, the second medial joint devices extending between the second joint device and the plurality of first medial joint devices at intervals of 0.60 to 1.25 m.

10. The non-kinking vacuum hose system of claim 9, wherein:

the first joint device is positioned approximately 0.20 m from the first coupler;

the second joint device is positioned approximately 0.20 m from the second coupler;

the plurality of first medial joint devices is positioned 1.50 to 1.85 m from the first joint device;

the plurality of first medial joint devices comprises two or three first medial joint devices separated by 1.50 to 1.85 m;

the plurality of second medial joint devices is approximately 0.91 m from the plurality of first medial joint devices; and the plurality of second medial joint devices comprising four second medial joint devices separated by approximately 0.91 m, such that the vacuum hose measures between approximately 7.95 m to 10.50 m.

\* \* \* \* \*